(12) United States Patent
Wang et al.

(10) Patent No.: US 11,417,014 B2
(45) Date of Patent: Aug. 16, 2022

(54) METHOD AND APPARATUS FOR CONSTRUCTING MAP

(71) Applicant: BEIJING BAIDU NETCOM SCIENCE AND TECHNOLOGY CO., LTD., Beijing (CN)

(72) Inventors: Zhihao Wang, Beijing (CN); Chenxu Zhao, Beijing (CN); Ziwen Qin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 95 days.

(21) Appl. No.: 17/020,171

(22) Filed: Sep. 14, 2020

(65) Prior Publication Data

US 2021/0272313 A1 Sep. 2, 2021

(30) Foreign Application Priority Data

Feb. 28, 2020 (CN) .......................... 202010126478.4

(51) Int. Cl.
*G06T 7/73* (2017.01)
*G06T 7/246* (2017.01)
(Continued)

(52) U.S. Cl.
CPC .............. *G06T 7/73* (2017.01); *G06K 9/6201* (2013.01); *G06T 7/11* (2017.01); *G06T 7/246* (2017.01); *G06V 30/274* (2022.01)

(58) Field of Classification Search
CPC ... G06T 3/0012; G06T 3/0018; G06T 3/0062; G06T 7/20; G06T 7/246; G06T 7/70;
(Continued)

(56) References Cited

U.S. PATENT DOCUMENTS

| | | | |
|---|---|---|---|
| 8,787,700 B1* | 7/2014 | Aly et al. | .......... G06V 20/10 |
| | | | 382/294 |
| 2009/0116764 A1 | 5/2009 | Liu et al. | .......... 382/284 |

(Continued)

FOREIGN PATENT DOCUMENTS

| | | | | |
|---|---|---|---|---|
| CN | 107843251 A | 3/2018 | ............. | G01C 21/00 |
| CN | 108776976 A | 11/2018 | ............. | G06T 7/246 |

(Continued)

OTHER PUBLICATIONS

Lemaire et al., "SLAM with Panoramic Vision," Journal of Field Robotics, vol. 24, No. 1-2, Jan. 1, 2007, 30 pages.
(Continued)

*Primary Examiner* — Andrew W Johns
(74) *Attorney, Agent, or Firm* — Seed IP Law Group LLP

(57) ABSTRACT

Embodiments of the present disclosure provides a method and apparatus for constructing a map. The method may include: determining pose information of each panoramic image frame from a panoramic image sequence of a target area, and determining a perspective image sequence from each panoramic image frame; determining a feature track corresponding to the panoramic image sequence based on perspective image sequences corresponding to adjacent panoramic image frames; and constructing a visual map of the target area based on the feature track and the pose information of each panoramic image frame.

15 Claims, 6 Drawing Sheets

(51) Int. Cl.
*G06T 7/11* (2017.01)
*G06K 9/62* (2022.01)
*G06V 30/262* (2022.01)

(58) Field of Classification Search
CPC ... G06T 7/73; G06T 7/97; G06T 2207/30244; G06K 9/00; G06V 10/62; G06V 20/40; G06V 20/41; G06V 20/42; G06V 20/43; G06V 20/44; G06V 20/46; G06V 20/47; G06V 20/48; G06V 20/49; G01C 21/3804; G01C 21/3807; G01C 21/3833; G01C 21/3837
See application file for complete search history.

(56) References Cited

U.S. PATENT DOCUMENTS

2012/0300020 A1* 11/2012 Arth et al. ............... G06T 7/75
348/E7.001
2013/0216098 A1 8/2013 Hasegawa et al. ...........
G06K 9/00664
2014/0320593 A1* 10/2014 Pirchheim et al. .. H04N 13/289
348/36

FOREIGN PATENT DOCUMENTS

| CN | 109509230 A | | 3/2019 | ............... G06T 7/73 |
| JP | 2012-64131 A | * | 3/2012 | ............... G05D 1/02 |
| JP | 2016-157197 A | * | 9/2016 | ............... G06T 7/20 |
| JP | 2019-125227 A | | 7/2019 | ............... G06T 1/00 |
| JP | 2021-505979 A | | 2/2021 | ............... G06T 7/579 |
| WO | 2019/233090 A1 | | 12/2019 | ............... G06T 7/246 |

OTHER PUBLICATIONS

Japanese Office Action for Japanese Application No. 2021-030704, dated Feb. 8, 2022, 7 pages.

* cited by examiner

METHOD AND APPARATUS FOR CONSTRUCTING MAP

CROSS-REFERENCE TO RELATED APPLICATIONS

This application claims priority to Chinese Patent Application No. 202010126478.4, filed on Feb. 28, 2020, titled "Method and apparatus for constructing map," which is hereby incorporated by reference in its entirety.

TECHNICAL FIELD

Embodiments of the present disclosure relate to the field of computer technology, and more particularly, to the field of computing technology vision technology, and more particularly, to a method and apparatus for constructing a map.

BACKGROUND

In the field of constructing visual maps, image data of a target scene is generally acquired using a customized monocular or binocular camera. The visual map of the target scene is then constructed using the visual SLAM (Simultaneous Localization and Mapping) technique or the SFM (Structure From Motion) algorithm by using the acquired video stream or picture as input data.

In the related art, when acquiring image data of a target scene, different scenes need different acquiring methods, and it is necessary to ensure a certain degree of repetition between the images. Therefore, the professional quality of a data acquisition personnel is required to be high. In particular, in some special scenes, because the field angle of view of a camera is not large enough, a situation in which the texture of the entire image is very small, such as a white wall, a floor, and a large piece of glass, is often encountered, which may cause a failure in feature tracking between the images, and may also affect the drawing accuracy to a certain extent.

SUMMARY

Embodiments of the present disclosure provide a method and apparatus for constructing a map.

In a first aspect, an embodiment of the present disclosure provides a method for constructing a map, including: determining pose information of each panoramic image frame from a panoramic image sequence of a target area, and determining a perspective image sequence from each panoramic image frame; determining a feature track corresponding to the panoramic image sequence based on perspective image sequences corresponding to adjacent panoramic image frames; and constructing a visual map of the target area based on the feature track and the pose information of each panoramic image frame.

In some embodiments, the feature track is obtained by performing following feature point matching on the panoramic image sequence: determining a first panoramic image frame in the panoramic image sequence as a target frame, and determining a preset number of panoramic image frames following the target frame in the panoramic image sequence as a matching frame sequence, the preset number being greater than 1; reading a perspective image sequence corresponding to the target frame and perspective image sequences corresponding to respective matching frames in the matching frame sequence into a preset sliding window respectively, and obtaining a partial feature track based on a result of performing inter-frame feature point matching in the sliding window between the target frame and the perspective image sequences corresponding to the respective matching frames; clearing the sliding window in response to completion of inter-frame feature point matching between the target frame and the respective matching frames, and deleting the target frame from the panoramic image sequence to obtain an updated panoramic image sequence; and performing the feature point matching on the updated panoramic image sequence until a last panoramic image frame in the panoramic image sequence has been used as a matching frame to complete the inter-frame feature point matching with the target frame to obtain the feature track.

In some embodiments, the obtaining a partial feature track based on a result of inter-frame feature point matching in the sliding window between the target frame and the perspective image sequences corresponding to the respective matching frames includes: taking the result of performing inter-frame feature point matching in the sliding window between the target frame and the perspective image sequences corresponding to the respective matching frames as the partial feature track.

In some embodiments, the obtaining a partial feature track based on a result of inter-frame feature point matching in the sliding window between the target frame and the perspective image sequences corresponding to the respective matching frames includes: using the result of performing inter-frame feature point matching in the sliding window between the target frame and the perspective image sequences corresponding to the respective matching frames as a first matching result; performing inter-frame feature point matching between each perspective image in the perspective image sequence corresponding to the target frame and a perspective image sequence corresponding to a matching frame closest to the target frame to obtain a second matching result; and obtaining the partial feature track based on the first matching result and the second matching result.

In some embodiments, the determining pose information of each panoramic image frame from a panoramic image sequence of a target area, and determining a perspective image sequence from each panoramic image frame includes: performing semantic segmentation on each of panoramic image frames, and deleting a preset segmentation target from each of the panoramic image frames to obtain preprocessed panoramic image frames; determining pose information of each panoramic image frame from the preprocessed panoramic image frames, and determining a perspective image sequence from each panoramic image frame.

In some embodiments, the method further includes performing following operations on the visual map: performing a triangulation on feature points in the visual map to determine three-dimensional coordinates of the feature points; performing a global beam adjustment optimization based on a visual constraint and a relative pose constraint on the feature points and the pose information to obtain updated feature points and pose information; performing a triangulation based on Random Sample Consensus (RANSAC) on the updated feature points, and deleting a mismatching point in the feature points to obtain second time updated feature points; performing the global beam adjustment optimization based on the visual constraint and the relative pose constraint on the updated pose information and the second time updated feature points to obtain second time updated pose information and third time updated feature points; and determining an updated visual map based on the second time updated pose information and the third time updated feature points.

In a second aspect, an embodiment of the present disclosure provides an apparatus, including: an image processing unit configured to determine pose information of each panoramic image frame from a panoramic image sequence of a target area, and determine a perspective image sequence from each panoramic image frame; a feature matching unit configured to determine a feature track corresponding to each panoramic image sequence based on perspective image sequences corresponding to adjacent panoramic image frames; and a map constructing unit configured to construct a visual map of the target area based on the feature track and the pose information of each panoramic image frame.

In some embodiments, the feature matching unit derives the feature track via: a target frame determining unit configured to determine a first panoramic image frame in the panoramic image sequence as a target frame, and determine a preset number of panoramic image frames following the target frame in the panoramic image sequence as a matching frame sequence, the preset number being greater than 1; a sliding window matching unit configured to read a perspective image sequence corresponding to the target frame and perspective image sequences corresponding to respective matching frames in the matching frame sequence into a preset sliding window respectively, and obtain a partial feature track based on a result of performing inter-frame feature point matching in the sliding window between the target frame and the perspective image sequences corresponding to the respective matching frames; a sequence updating unit configured to clear the sliding window in response to completion of inter-frame feature point matching between the target frame and the respective matching frames, and delete the target frame from the panoramic image sequence to obtain an updated panoramic image sequence; and a track acquiring unit configured to perform the feature point matching on the updated panoramic image sequence until a last panorama frame in the panoramic image sequence has been used as a matching frame to complete inter-frame feature point matching with the target frame to obtain the feature track.

In some embodiments, the sliding window matching unit is configured to obtain the partial feature track by: taking the result of performing inter-frame feature point matching in the sliding window between the target frame and the perspective image sequences corresponding to the respective matching frames in the sliding window as the partial feature track.

In some embodiments, the sliding window matching unit is further configured to obtain the partial feature trace by: using the result of performing inter-frame feature point matching in the sliding window between the target frame and the perspective image sequences corresponding to the respective matching frames as a first matching result; performing inter-frame feature point matching between each perspective image in the perspective image sequence corresponding to the target frame and a perspective image sequence corresponding to a matching frame closest to the target frame to obtain a second matching result; and obtaining the partial feature track based on the first matching result and the second matching result.

In some embodiments, the apparatus further comprises a semantic segmentation unit configured to: perform semantic segmentation on each of panoramic image frames, and delete a preset segmentation target from each of the panoramic image frames to obtain preprocessed panoramic image frames; determine pose information of each panoramic image frame from the preprocessed panoramic image frames, and determine a perspective image sequence from each panoramic image frame.

In some embodiments, the apparatus further comprises a map updating unit configured to: perform a triangulation on the feature points in the visual map to determine three-dimensional coordinates of the feature points; perform a global beam adjustment optimization based on a visual constraint and a relative pose constraint on the feature points and the pose information to obtain updated feature points and the pose information; perform a triangulation based on Random Sample Consensus (RANSAC) on the updated feature points, and delete a mismatching point in the feature points to obtain second time updated feature points; perform the global beam adjustment optimization based on the visual constraint and the relative pose constraint on the updated pose information and the second time updated feature points to obtain second time updated pose information and third time updated feature points; and determine an updated visual map based on the second time updated pose information and the third time updated feature points.

The method and apparatus for constructing a map according to embodiments of the present disclosure, determining a corresponding feature track based on a perspective image sequence determined from a panoramic image sequence of a target area, and constructing a visual map in combination with pose information of panoramic image frames, thereby reducing the difficulty of acquiring an image in the process of constructing the map, and reducing adverse impact of quality of the acquired image on accuracy of constructing the visual map.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION

Figure 1:
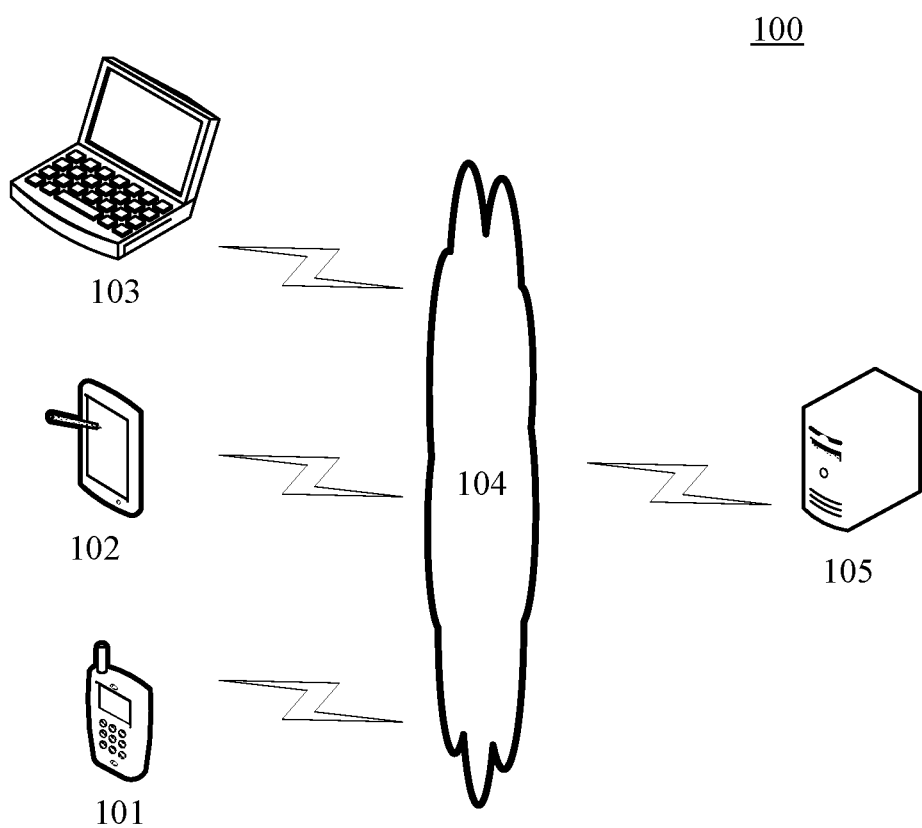
FIG. 1 is an example system architecture diagram in which some embodiments of the present disclosure may be applied.

The present disclosure is described in further detail below with reference to accompanying drawings and embodiments. It is to be understood that the specific embodiments described herein are merely illustrative of the related disclosure and are not restrictive of the disclosure. It is also to be noted that, for ease of description, only parts related to the disclosure are shown in the drawings.

It is noted that embodiments in the present disclosure and features in the embodiments may be combined with each other without conflict. The present disclosure will now be described in detail with reference to the accompanying drawings and examples.

FIG. 1 illustrates an example system architecture 100 of a method for constructing a map or an apparatus for constructing a map in which some embodiments of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, or fiber optic cables, among others.

The user may interact with the server 105 through the network 104 using the terminal devices 101, 102, 103 to receive or transmit data. The terminal devices 101, 102, 103 may transmit the acquired panoramic image sequence of the target area (e.g., a video composed of panoramic images) to the server 105, and the server 105 executes the method for constructing a map proposed by some embodiments of the present disclosure, constructs a visual map based on the acquired panoramic image sequence of the target area, and transmits the constructed visual map to the terminal device.

The terminal devices 101, 102, 103 may be hardware or software. When the terminal devices 101, 102, 103 are hardware, they may be various electronic devices having a display screen and supporting information exchange, including but not limited to a smartphone, a tablet computer, an electronic book reader, a laptop computer, a desktop computer, and the like. When the terminal devices 101, 102, and 103 are software, they may be installed in the electronic devices listed above, and may be implemented, for example, as a plurality of pieces of software or software modules for providing distributed services, or as a single piece of software or software module, which is not specifically limited herein.

The server 105 may be a server providing various services, such as a background application server providing support for panoramic image sequences of target areas acquired on the terminal devices 101, 102, 103. The background application server may construct a visual map of the target area based on the received panoramic image sequence and send the constructed visual map to the terminal device.

It should be noted that the method for constructing a map provided in embodiments of the present disclosure may be executed by the terminal devices 101, 102, 103, or may be executed by the server 105. Accordingly, the apparatus for constructing a map may be provided in the terminal devices 101, 102, 103, or may be provided in the server 105, which is not specifically limited herein.

It should be noted that the server may be hardware or software. When the server is hardware, it may be implemented as a distributed server cluster composed of multiple servers, or a single server. When the server is software, it may be implemented, for example, as a plurality of pieces of software or software modules for providing distributed services, or it may be implemented as a single piece of software or software module, which is not specifically limited herein.

It should be understood that the number of terminal devices, networks and servers in FIG. 1 is merely illustrative. There may be any number of terminal devices, networks, and servers as desired for implementation.

Figure 2:
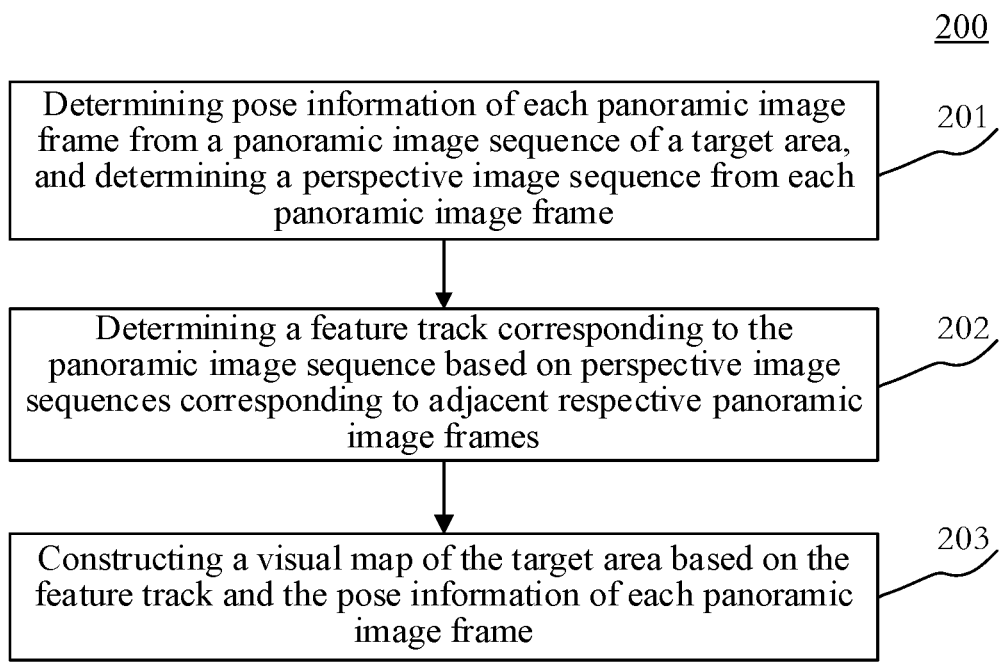
FIG. 2 is a flowchart of a method for constructing a map according to an embodiment of the present disclosure.

With continuing reference to FIG. 2, a flow 200 of a method for constructing a map according to an embodiment of the present disclosure is shown. The method for constructing a map includes the following steps.

Step 201, determining pose information of each panoramic image frame from a panoramic image sequence of a target area, and determining a perspective image sequence from each panoramic image frame.

In the present embodiment, the perspective image sequence is used to determine the feature track of the panoramic image sequence, and the feature track and the pose information are key data for constructing the visual map.

In the present embodiment, an executing body (for example, the server shown in FIG. 1) of a method for constructing a map may receive a panoramic image sequence of a target area from a terminal or a panoramic camera that user uses for map construction through a wired connection method or a wireless connection method. It should be noted that the above wireless connection methods may include, but are not limited to, 3G/4G connections, WiFi connections, Bluetooth connections, WiMAX connections, Zigbee connections, UWB (ultra wideband) connections, and other wireless connection methods now known or developed in the future.

In a specific example, an operator may acquire a panoramic image sequence of a target area through a panoramic camera, and then transmit the panoramic image sequence to the executing body (for example, the server or the terminal device shown in FIG. 1) of the present embodiment, and the executing body determines pose information of each panoramic image frame and a corresponding perspective sequence from the panoramic image sequence through the above steps.

The panoramic image refers to an image acquired by a panoramic camera, and image information of a target area can be acquired omnidirectionally at an observation angle of 360°. Compared with a perspective view acquired by a conventional camera, information contained in the panoramic image is more abundant, so that a case in which information is lost in an image acquisition process can be avoided. However, a certain degree of image distortion may exist in the panoramic image, so that the panoramic image cannot be directly used for map construction as the perspective image acquired by a common camera. Therefore, the panoramic image needs to be preprocessed so as to be used for performing subsequent map construction steps.

In the present embodiment, after the executing body (such as the server shown in FIG. 1) receives the panoramic image sequence of the target area (for example, the panoramic video of the target area captured by the panoramic camera), the image preprocessing steps are performed, where each image frame in the panoramic image sequence is a panoramic image of the target area. As an example, the pose information of each panoramic image frame in the sequence can first be determined based on the visual SLAM technique, where the pose information is used to characterize the position and posture of the camera when the image is acquired. A plurality of perspective images are then determined from each panoramic image frame, each perspective image corresponding to a different preset observation angle, and the distorted image portion in the panoramic image frame is corrected in the process. For example, a panoramic image frame may be split based on four observation angles of 0°, 90°, 180°, and 270°, and four perspective images are sequentially determined, and the perspective images are sorted according to the observation angles to obtain a perspective image sequence corresponding to the panoramic image frame. It should be noted that the visual SLAM technology belongs to the existing art in the field of map construction, and details are not described herein. A technique for determining a plurality of perspective images from a panoramic image based on an observation angle also belongs to the existing art in the field of computer images. For example, the technique may be implemented by an OpenCV algorithm, which is not limited in the embodiments of the present disclosure.

In some alternative implementations of the present embodiment, the pose information and the perspective image sequence can alternatively be determined from the panoramic image frame by the following steps: performing semantic segmentation on the panoramic image frame of the target area, deleting a preset segmentation target from the panoramic image sequence to obtain preprocessed panoramic image data; determining pose information of each panoramic image frame from the preprocessed panoramic image frame, and determining a perspective image sequence from each panoramic image frame. As an example combining with a specific scenario, when a panoramic image of the target area contains invalid content for constructing a map, it is necessary to remove the content from the panoramic image so as to reduce unnecessary operations. For example, an object such as a human, an animal, and a plant may be set as a segmentation target, a panoramic image frame is input to a semantic segmentation model (for example, a full-convolutional neural network model), the segmentation target is deleted from the panoramic image to obtain a preprocessed panoramic image frame, and then, based on a visual SLAM technique, pose information of the preprocessed panoramic image frame is determined, and a perspective sequence is determined from the panoramic image frame.

Step 202: determining a feature track corresponding to the panoramic image sequence based on perspective image sequences corresponding to adjacent respective panoramic image frames.

In the field of map construction, by matching the same feature points in different image frames together, a feature track corresponding to respective image frames can be obtained. The motion state of the camera is deduced from the feature track, and then the three-dimensional coordinates of the feature points can be obtained based on the position information of the feature points and the motion state of the camera, which is an indispensable step in the process of constructing the visual map.

In this embodiment, the feature track corresponding to the panoramic image sequence is obtained by performing inter-frame feature point matching on the perspective image sequences corresponding to the respective panoramic image frames obtained in step 201. Specifically, feature points are determined from each perspective image sequence, the feature point includes a key point and a descriptor, the key point is a point (e.g., corner scale, rotation characteristic, or the like) in an image frame including key information for constructing a map, and the descriptor is used to distinguish each feature point for matching the feature points between different image frames, and a higher similarity of the descriptor indicates a higher similarity of the corresponding feature points. Then, inter-frame feature point matching is performed between the perspective image sequences corresponding to the adjacent panoramic image frames. For example, the perspective images in the same ordering position in the two perspective image sequences may be used as matching objects, and the same or similar feature points therein may be matched.

The method for extracting the feature points and the method for calculating the similarity of the feature points may be a method for extracting the feature points and a method for calculating the similarity of the feature points in the prior art or a technique developed in the future, which is not limited in the present disclosure.

In a specific example, feature points are extracted from two perspective images using an ORB (Oriented FAST and Rotated BRIEF) feature point algorithm, wherein the feature points include a descriptor that is a BRIEF binary descriptor and a Hamming distance is used to characterize the degree of similarity between the two feature points. Hamming distance refers to the number of different data bits between two strings of equal length, for example, two 8-bit binary strings 00110100 and 10110100, which differ only by the first data bit, so that their Hamming distance is 1. In feature matching of the ORB algorithm, the smaller the Hamming distance, the higher the similarity of the feature points. Thus, two feature points whose similarity between two perspective images meets a preset criterion are considered to be the same point, that is, feature matching is completed.

In contrast to the related art in which inter-frame feature point matching is performed by two adjacent individual image frames, while in the embodiment of the present disclosure, inter-frame feature point matching is performed on two perspective image sequences corresponding to two adjacent panoramic image frames. Since the observation angles corresponding to the perspective images in the same sorting position in the perspective sequenced are the same, the perspective images can be used as matching objects to perform inter-frame feature point matching, and then the feature matching results of all the perspective images in the perspective image sequence are combined, so that the obtained feature matching result by combining is the feature matching result between the two panoramic image frames. Finally, the feature matching results of the respective panoramic image frames are combined to obtain a feature track corresponding to the panoramic image sequence.

It should be noted that the combination of the feature matching results and the feature tracks involved in the embodiment of the present disclosure is based on a rule that all feature points are retained and the same feature points therein are combined into one.

In the following example combined with a specific scenario, the panoramic image sequence includes three panoramic image frames A, B, and C, which correspond to three perspective image sequences a, b, and c, respectively. Each perspective image sequence includes four perspective images, which are sequentially arranged in the order of the size of observation angles, the observation angles are a1, a2, a3, a4, b1, b2, b3, b4, c1, c2, c3, c4, respectively. The a1 and b1, a2 and b2, a3 and b3, and a4 and b4 are respectively used as matching objects to perform inter-frame feature point matching, and the matching results are combined to obtain a matching result of the perspective image sequence a and the perspective image sequence b. The matching result of the perspective image sequence b and the perspective image sequence c can be obtained by analogy. The matching results of the two groups of perspective image sequences are combined to obtain a feature track of the panoramic image sequence.

In some alternative implementations of the present embodiment, the inter-frame feature point matching may be performed on the perspective image sequence by the sliding window matching method, and the inter-frame feature point matching may be simultaneously performed on the perspective image sequence corresponding to the target frame and the perspective image sequences corresponding to the adjacent plurality of matching frames, so as to obtain the feature track corresponding to the panoramic image. The sliding window matching method may include the following steps: determining the first panoramic image frame in the panoramic image sequence as a target frame, and determining a preset number of panoramic image frames in the panoramic image sequence following the target frame as a matching frame sequence, the preset number being greater than 1; respectively reading a perspective image sequence corresponding to a target frame and perspective image sequences corresponding to respective matching frames in the matching frame sequence into a preset sliding window, and obtaining a partial feature track based on a result of performing inter-frame feature point matching in the sliding window between the target frame and the perspective image sequences corresponding to the respective matching frames; clearing the sliding window in response to completion of inter-frame feature point matching between the target frame and the respective matching frames, and deleting the target frame from the panoramic image sequence to obtain an updated panoramic image sequence; and performing the feature point matching on the updated panoramic image sequence until the last panoramic image frame in the panoramic image sequence has been used as a matching frame to complete the inter-frame feature point matching with the target frame to obtain the feature track.

In some alternative implementations of the present embodiment, obtaining the partial feature track based on the result of inter-frame feature point matching in the sliding window between the target frame and the perspective image sequences corresponding to the respective matching frames may include: taking the result of performing inter-frame feature point matching in the sliding window between the target frame and the perspective image sequences corresponding to the respective matching frames as the partial feature track.

In a specific example, the first panoramic image frame A in the panoramic image sequence is determined as a target frame, the preset number is 3, then the second, third, and fourth panoramic image frames are determined as matching frames, which are panoramic image frames B, C, and D, respectively. The perspective image sequences corresponding to the above four panoramic image frames are a, b, c, and d, respectively, and each perspective image sequence includes four perspective images. The perspective image sequences corresponding to the above four panoramic image frames are simultaneously read into a preset sliding window, and inter-frame feature point matching is performed as follows: the first perspective image a1 in the perspective image sequence a is simultaneously matched with the inter-frame feature points b1, c1, and d1, and so on. After the four perspective images in the perspective image sequence a are respectively matched with the inter-frame feature points, a matching result of the perspective image sequence a can be obtained, and the matching result of the perspective image sequence a is used as a partial feature track corresponding to the panoramic image frame A. Then, A is deleted from the panoramic image sequence, B is updated to the target frame, and the corresponding panoramic image frames C, D, and F are updated to the matching frame. Through the above-mentioned steps, a partial feature track corresponding to the panoramic image frame B is obtained. Repeating the above steps until the last panoramic image in the panoramic image sequence is read into the sliding window as a matching frame to perform inter-frame feature point matching, thus inter-frame feature point matching for the entire panoramic image sequence is completed, and combining a plurality of partial feature tracks corresponding to each panoramic image frame, thereby obtaining a feature track corresponding to the panoramic image sequence.

In some alternative implementations of the present embodiment, the obtaining a partial feature track based on the result of performing inter-frame feature point matching in the sliding window between the target frame and the perspective image sequences corresponding to the respective matching frames may include: using the result of performing inter-frame feature point matching in the sliding window between the target frame and the perspective image sequences corresponding to the respective matching frames as a first matching result; performing inter-frame feature point matching between each perspective image in the perspective image sequence corresponding to the target frame and a perspective image sequence corresponding to a matching frame closest to the target frame to obtain a second matching result; and obtaining the partial feature track based on the first matching result and the second matching result.

Continue to illustrate the embodiment combining with the above examples, the first perspective image a1 in the perspective image sequence a is matched with the inter-frame feature points b1, c1, d1 at the same time, and so on. After the four perspective images in the perspective image sequence a are matched with the inter-frame feature points, the matching result of the perspective image sequence a can be obtained, and the matching result of the perspective image sequence a obtained in this manner is used as the first matching result corresponding to the panoramic image frame A. Further, the a1 may alternatively matched with inter-frame feature points b1, b2, b3, and b4, respectively, and a2 may be matched with inter-frame feature points b1, b2, b3, and b4, respectively, and so on. After the four perspective images in a are respectively matched with the inter-frame feature points, another matching result of the perspective image sequence a may be obtained, and this matching result is used as a second matching result corresponding to the panoramic image frame A. Then, the first matching result and the second matching result are combined to obtain a partial feature track corresponding to the panoramic image frame A, and the above steps are repeated to obtain a feature track corresponding to the panoramic image sequence.

Step 203: constructing a visual map of the target area based on the feature track and the pose information of each panoramic image frame.

In the present embodiment, the feature track obtained in step 202 is triangulated in combination with the pose information of the panoramic image frame, and the three-dimensional coordinates of the feature points therein can be determined to obtain a corresponding series of three-dimensional points. The three-dimensional spatial image composed of these three-dimensional points is the prototype of the visual map of the target area. Then, the closed-loop detection is performed to optimize the pose and merge similar three-dimensional points, and then the global pose and three-dimensional points are jointly optimized to obtain a visual map of the target area. It should be noted that the construction of a visual map based on a feature track is prior art in the field, and the embodiments of the present disclosure are not limited thereto.

Figure 3:
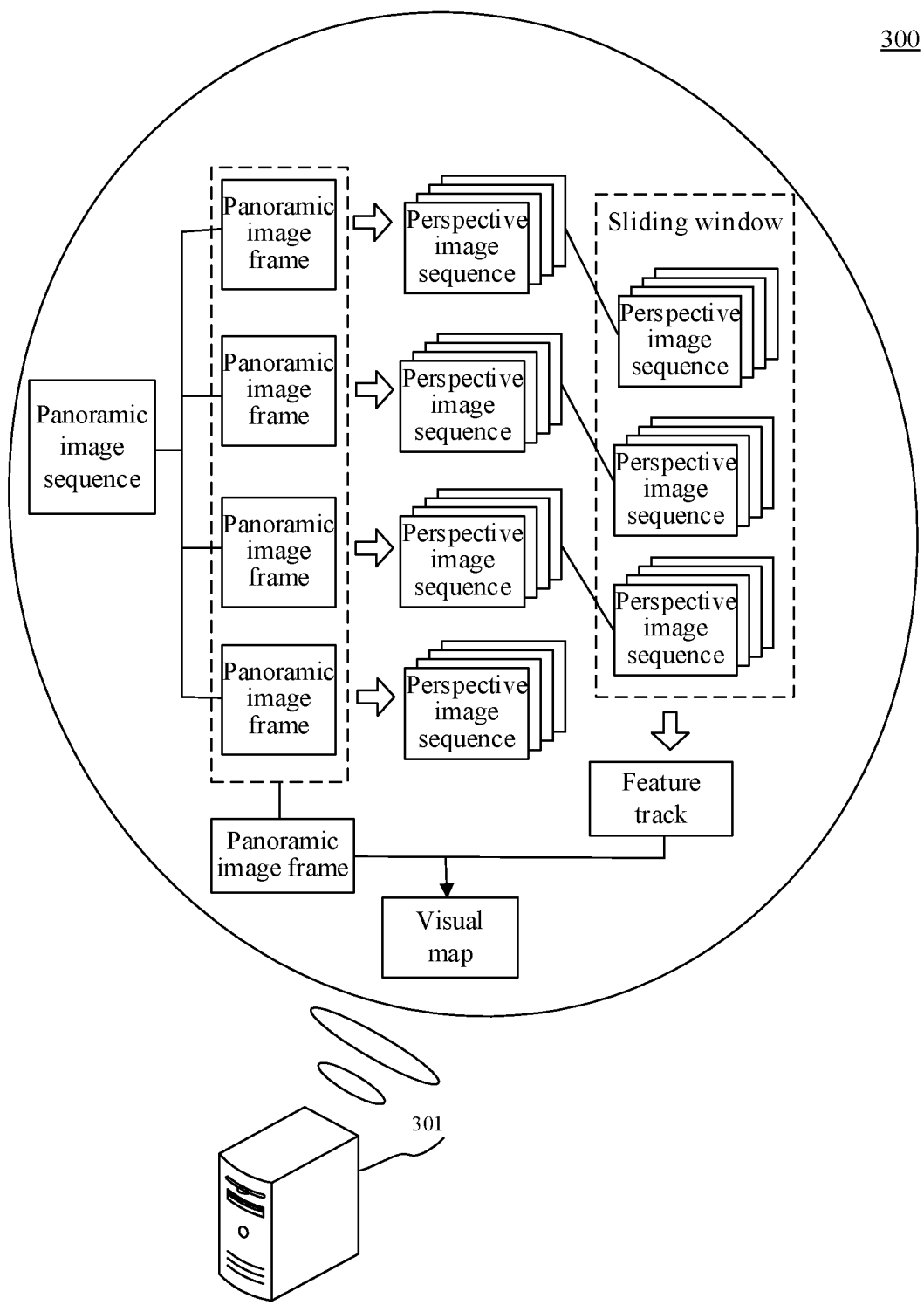
FIG. 3 is a schematic diagram of an application scenario of a method for constructing a map according to an embodiment of the present disclosure.

With continued reference to FIG. 3, FIG. 3 is a schematic diagram of an application scenario of a method for constructing a map according to the present embodiment. In the application scenario of FIG. 3, the user transmits the panoramic image sequence of the target area to the executing body 301 (which may be a server or a terminal as shown in FIG. 1), and the executing body determines the pose information and the perspective image sequence from the panoramic image sequence through image processing, then performs an inter-frame feature point matching to obtain a feature track, and finally constructs a visual map of the target area based on the feature track and the pose information of panoramic image frames, thereby realizing the process of constructing a visual map based on the panoramic image.

The method and apparatus for constructing a map provided in embodiments of the present disclosure, determining a perspective image sequence from a panoramic image sequence of a target area, determining a corresponding feature track, and constructing a visual map by combining position and pose information of a panoramic image frame, thereby reducing the difficulty of acquiring an image in the process of constructing the map, and reducing the influence of the quality of the acquired image on the accuracy of constructing the visual map.

Figure 4:
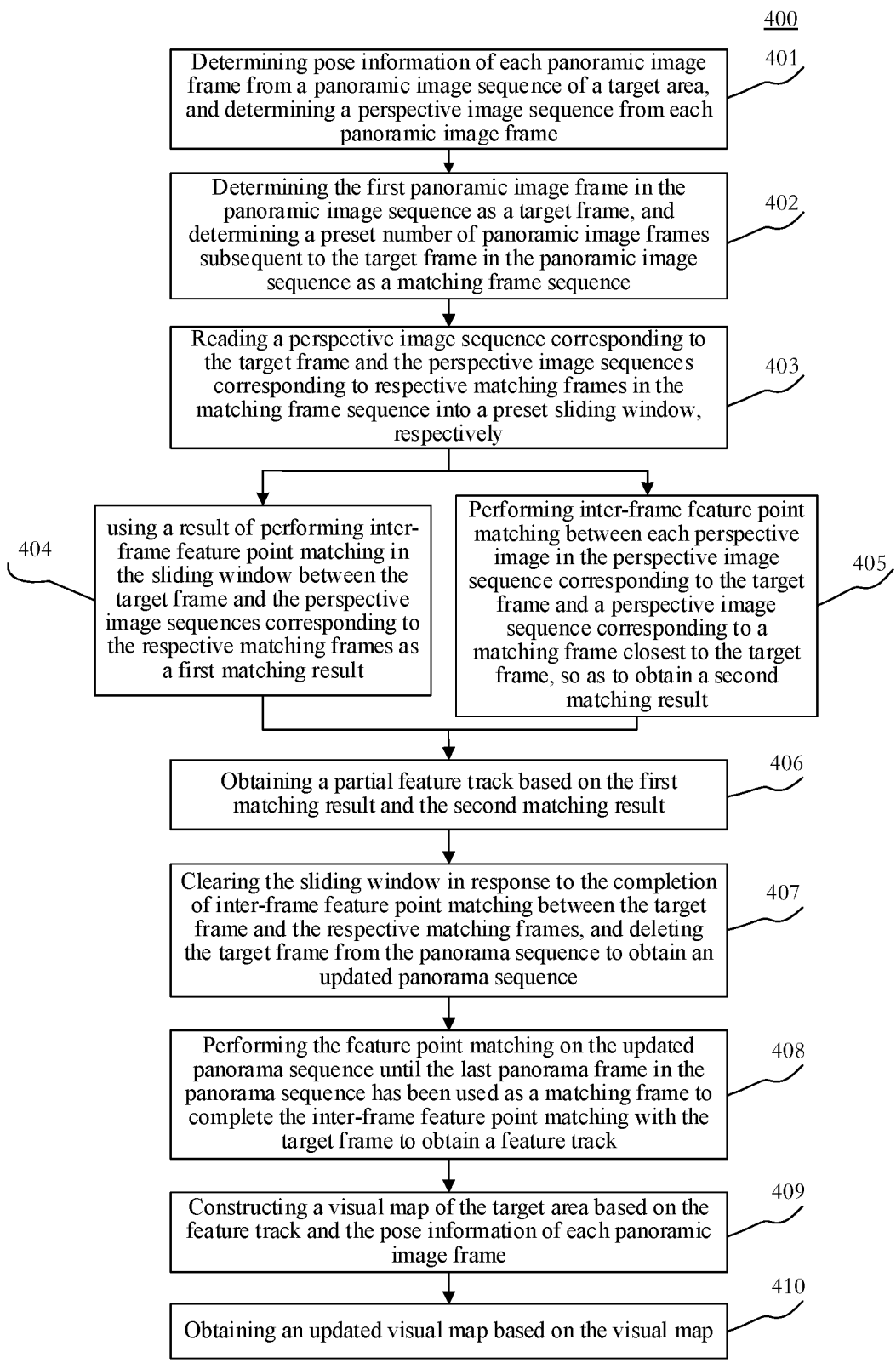
FIG. 4 is a flowchart of a method for constructing a map according to another embodiment of the present disclosure.

Referring further to FIG. 4, there is shown a flow 400 of a method for constructing a map according to another embodiment. The flow 400 of the method for constructing a map includes the following steps.

Step 401: determining pose information of each panoramic image frame from a panoramic image sequence of a target area, and determining a perspective image sequence from each panoramic image frame. This step corresponds to the foregoing step 201, and details are not described herein.

Step 402, determining the first panoramic image frame in the panoramic image sequence as a target frame, and determining a preset number of panoramic image frames subsequent to the target frame in the panoramic image sequence as a matching frame sequence. In this embodiment, the preset number is set to be an integer greater than 1.

Step 403, reading a perspective image sequence corresponding to the target frame and the perspective image sequences corresponding to respective matching frames in the matching frame sequence into a preset sliding window, respectively.

Step 404: using a result of performing inter-frame feature point matching in the sliding window between the target frame and the perspective image sequences corresponding to the respective matching frames as a first matching result. This step has been discussed in an alternative implementation of the foregoing embodiment and will not be repeated here. It should be noted that in the process of inter-frame feature point matching between two adjacent perspective image sequences, if image blurring or object shielding occurs, the matching fails. However, by using the sliding window matching method, the target frame is matched with multiple matching frames at the same time to perform inter-frame feature point matching. Even if a certain perspective image cannot be matched successfully, the target frame can still be matched with other corresponding perspective images, thereby reducing the probability of matching failure and improving the robustness of the map construction process.

Step 405: performing inter-frame feature point matching between each perspective image in the perspective image sequence corresponding to the target frame and a perspective image sequence corresponding to a matching frame closest to the target frame, so as to obtain a second matching result. This step has been discussed in an alternative implementation of the foregoing embodiment and will not be repeated here. It should be noted that, in comparison with the first matching result, the second matching result takes into account that the motion of the camera may cause some features to move from the observation range of one perspective image to the observation range of another perspective image, so that this matching result helps to more accurately calculate the motion state of the camera.

Step 406: obtaining a partial feature track based on the first matching result and the second matching result. This step has been discussed in an alternative implementation of the foregoing embodiment and will not be repeated here. The first matching result and the second matching result are combined to obtain a partial feature track corresponding to the target frame. It should be noted that the combination of the first matching result and the second matching result improves both the robustness of the map construction process and the accuracy of the constructed visual map.

Step 407: clearing the sliding window in response to the completion of inter-frame feature point matching between the target frame and the respective matching frames, and deleting the target frame from the panoramic image sequence to obtain an updated panoramic image sequence. This step has been discussed in an alternative implementation of the foregoing embodiment and will not be repeated here.

Step 408: performing the feature point matching on the updated panoramic image sequence until the last panorama frame in the panoramic image sequence has been used as a matching frame to complete the inter-frame feature point matching with the target frame to obtain a feature track. The partial feature traces corresponding to the panoramic image frames obtained in steps 403 to 408 are combined, and then the feature trace corresponding to the panoramic image sequence is obtained. This step has been discussed in an alternative implementation of the foregoing embodiment, and details are not described herein.

Step 409: constructing a visual map of the target area based on the feature track and the pose information of each panoramic image frame. This step corresponds to the foregoing step 203, and details are not described herein.

Step 410: obtaining an updated visual map based on the visual map. In the present embodiment, the optimal accuracy of the visual map can be further improved to obtain an updated visual map by: performing a triangulation on the feature points in the visual map to determine three-dimensional coordinates of the feature points; performing a global beam adjustment optimization based on the visual constraint and the relative pose constraint on the feature points and the pose information to obtain updated feature points and the pose information; performing a triangulation based on RANSAC (Random Sample Consensus) on the updated feature points, deleting a mismatching point in the feature points to obtain a second time updated feature points; performing the global beam adjustment optimization based on the visual constraint and the relative pose constraint on the updated pose information and the second time updated feature points to obtain second time updated pose information and third time updated feature points; and determining an updated visual map based on the second time updated pose information and the third time updated feature points.

With the above steps, the constructed visual map can be optimized, for example, partial mismatching points in the visual map can be removed by a triangulation step based on RANSAC, and the re-projection error of the feature points can be reduced by a global beam adjustment optimization step based on visual constraints and relative pose constraints, thereby obtaining a visual map with higher accuracy.

It should be noted that although the above-mentioned steps of triangulation and global beam adjustment optimization based on visual constraints and relative pose constraints are both relatively mature technical means in the art, the combination of the above-mentioned steps is not the prior art. Thus, the present embodiment defines a combination of the respective steps, rather than a technical means for implementing each step.

As can be seen from FIG. 4, compared with the corresponding embodiment of FIG. 2, the flow 400 of the method for constructing a map in the present embodiment embodies the step of determining a feature track based on the sliding window matching method and the step of optimizing the constructed visual map. By the sliding window matching method, the loss of key information caused by the failure of feature point matching can be effectively avoided, so that the robustness of the map construction process is improved, and the accuracy of the visual map is improved by optimizing the visual map.

Figure 5:
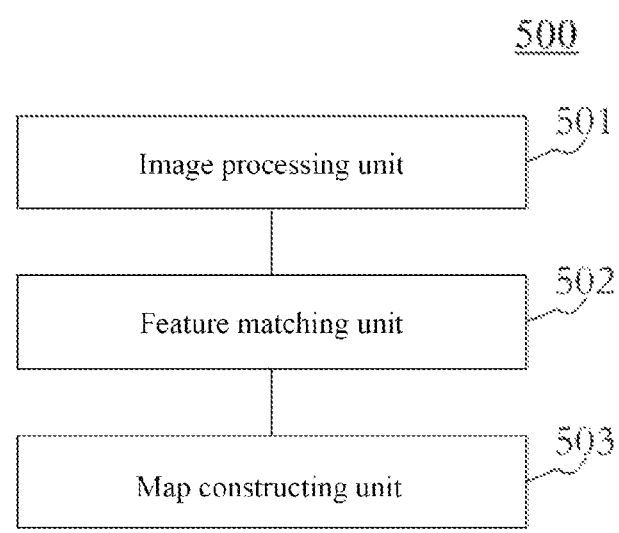
FIG. 5 is a schematic structural diagram of an apparatus for constructing a map according to an embodiment of the present disclosure.

With further reference to FIG. 5, as an implementation of the method shown in each of the above figures, an embodiment of the present disclosure provides an apparatus for constructing a map, which corresponds to the method embodiment shown in FIG. 2 and which is particularly applicable to various electronic devices.

As shown in FIG. 5, the apparatus 500 for constructing a map of the present embodiment includes an image processing unit 501 configured to determine pose information of each panoramic image frame from a panoramic image sequence of a target area, and determine a perspective image sequence from each panoramic image frame; a feature matching unit 502 configured to determine a feature track corresponding to the panoramic image sequence based on perspective image sequences corresponding to adjacent panoramic image frames; a map constructing unit 503 is configured to construct a visual map of the target area based on the feature track and the pose information of each panoramic image frame.

In the present embodiment, the feature matching unit 502 obtains a feature track via a target frame determining unit configured to determine a first panoramic image frame in the panoramic image sequence as a target frame, and determine a preset number of panoramic image frames following the target frame in the panoramic image sequence as a matching frame sequence, the preset number being greater than 1; a sliding window matching unit configured to read a perspective image sequence corresponding to the target frame and perspective image sequences corresponding to respective matching frames in the matching frame sequence into a preset sliding window respectively, and obtain a partial feature track based on a result of performing inter-frame feature point matching in the sliding window between the target frame and the perspective image sequences corresponding to the respective matching frames; a sequence updating unit configured to clear the sliding window in response to completion of inter-frame feature point matching between the target frame and the respective matching frames, and delete the target frame from the panoramic image sequence to obtain an updated panoramic image sequence; and a track acquiring unit configured to perform the feature point matching on the updated panoramic image sequence until the last panorama frame in the panoramic image sequence has been used as a matching frame to complete inter-frame feature point matching with the target frame to obtain the feature track.

In the present embodiment, the sliding window matching unit is configured to obtain the partial feature track by: taking the result of performing inter-frame feature point matching in the sliding window between the target frame and the perspective image sequences corresponding to the respective matching frames in the sliding window as the partial feature track.

In the present embodiment, the sliding window matching unit is further configured to obtain the partial feature track by: using the result of performing inter-frame feature point matching in the sliding window between the target frame and the perspective image sequences corresponding to the respective matching frames as a first matching result; performing inter-frame feature point matching between each perspective image in the perspective image sequence corresponding to the target frame and a perspective image sequence corresponding to a matching frame closest to the target frame to obtain a second matching result; and obtaining the partial feature track based on the first matching result and the second matching result.

In the present embodiment, the apparatus further includes a semantic segmentation unit configured to perform semantic segmentation on each of panoramic image frames, and delete a predetermined segmentation target from each of the panoramic image frames to obtain preprocessed panoramic image frames; determine pose information of each panoramic image frame from the preprocessed panoramic image frames, and determine a perspective image sequence from each panoramic image frame.

In the present embodiment, the apparatus further includes a map updating unit configured to perform a triangulation on the feature points in the visual map to determine three-dimensional coordinates of the feature points; perform a global beam adjustment optimization based on a visual constraint and a relative pose constraint on the feature points and the pose information to obtain updated feature points and the pose information; performing a triangulation based on RANSAC on the updated feature points, and delete a mismatching point in the feature points to obtain second updated feature points; perform the global beam adjustment optimization based on the visual constraint and the relative pose constraint on the updated pose information and the second time updated feature points to obtain second time updated pose information and third time updated feature points; and determine an updated visual map based on the second time updated pose information and the third time updated feature points.

Figure 6:
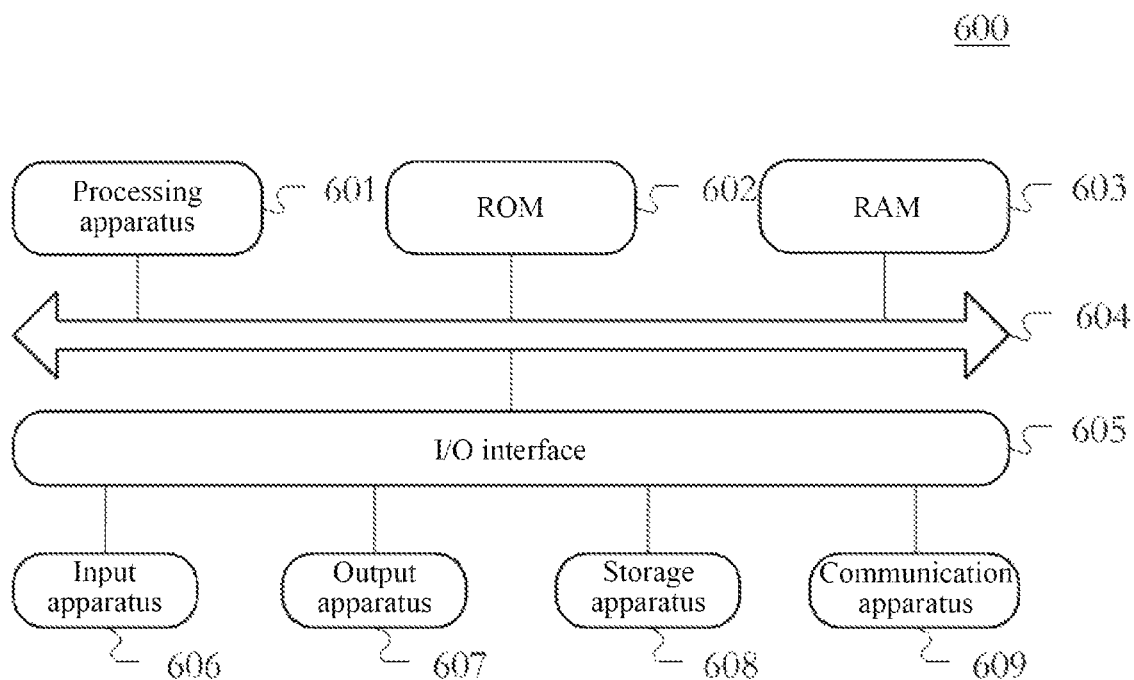
FIG. 6 is a schematic structural diagram of an electronic device suitable for implementing some embodiments of the present disclosure.

Referring now to FIG. 6, there is shown a schematic structural diagram of an electronic device (e.g., a server or terminal device in FIG. 1) 600 suitable for implementing some embodiments of the present disclosure. The terminal device in embodiments of the present disclosure may include, but are not limited to, a mobile terminal such as a mobile phone, a notebook computer, a digital broadcast receiver, a PDA (Personal Digital Assistant), a PAD (Tablet Computer), a PMP (Portable Multimedia Player), an in-vehicle terminal (e.g., an in-vehicle navigation terminal), or the like, and a fixed terminal such as a digital TV, a desktop computer, or the like. The terminal device/server shown in FIG. 6 is merely an example and should not be construed as limiting the functionality and scope of use of the embodiments of the present disclosure.

As shown in FIG. 6, the electronic device 600 includes a processing apparatus (such as a Central Processing Unit, a Graphics Processing Unit, or the like) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The CPU 601, the ROM 602 and the RAM 603 are connected to each other through a bus 604. An input/output (I/O) interface 605 is also connected to the bus 604.

The following components are connected to the I/O interface 605: an input apparatus 606 including a touch screen, a touch panel, a keyboard, a mouse, a camera, a microphone, an accelerometer, a gyroscope, and the like; an output apparatus 607 including a c liquid crystal display device (LCD), a speaker, a vibrator, and the like; a storage apparatus 608 including a tape, a hard disk and the like; and a communication apparatus 609. The communication portion 609 may allow the electronic device 600 to communicate with other devices to exchange data via wireless or wired method. Although FIG. 6 shows an electronic device 600 having various apparatus, it should be understood that it is not required to implement or have all the apparatus shown. More or fewer apparatus may be implemented or provided instead. Each block shown in FIG. 6 can represent one apparatus or multiple apparatus as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 609, or may be installed from the storage apparatus 608, or may be installed from the ROM 602. The computer program, when executed by the processing apparatus 601, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

The computer-readable medium may be included in the electronic device; or may exist alone without being assembled into the electronic device. The computer-readable medium carries one or more programs, and the one or more programs when executed by the electronic device, cause the electronic device to: determine pose information of each panoramic image frame from a panoramic image sequence of a target area, and determine a perspective image sequence from each panoramic image frame; determine a feature track corresponding to each panoramic image sequence based on perspective image sequences corresponding to adjacent panoramic image frames; and construct a visual map of the target area based on the feature track and the pose information of each panoramic image frame.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an image processing unit, a feature matching unit, and a map constructing unit. Here, the names of these units do not in some cases constitute a limitation to such units themselves. For example, the generating unit may also be described as "a unit configured to determine pose information of each panoramic image frame from a panoramic image sequence of a target area, and determine a perspective image sequence from each panoramic image frame."

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for constructing a map, comprising:
performing semantic segmentation on each of panoramic image frames from a panoramic image sequence of a target area, and deleting a preset segmentation target from each of the panoramic image frames to obtain preprocessed panoramic image frames;
determining pose information of each panoramic image frame from the preprocessed panoramic image frames, and determining a perspective image sequence from each panoramic image frame;
determining a feature track corresponding to the panoramic image sequence based on perspective image sequences corresponding to adjacent panoramic image frames; and
constructing a visual map of the target area based on the feature track and the pose information of each panoramic image frame.

2. The method of claim 1, wherein the feature track is obtained by performing following feature point matching on the panoramic image sequence:
determining a first panoramic image frame in the panoramic image sequence as a target frame, and determining a preset number of panoramic image frames following the target frame in the panoramic image sequence as a matching frame sequence, the preset number being greater than 1;
reading a perspective image sequence corresponding to the target frame and perspective image sequences corresponding to respective matching frames in the matching frame sequence into a preset sliding window respectively, and obtaining a partial feature track based on a result of performing inter-frame feature point matching in the sliding window between the target frame and the perspective image sequences corresponding to the respective matching frames;
clearing the sliding window in response to completion of inter-frame feature point matching between the target frame and the respective matching frames, and deleting the target frame from the panoramic image sequence to obtain an updated panoramic image sequence; and
performing the feature point matching on the updated panoramic image sequence until a last panoramic image frame in the panoramic image sequence has been used as a matching frame to complete the inter-frame feature point matching with the target frame to obtain the feature track.

3. The method of claim 2, wherein the obtaining a partial feature track based on a result of inter-frame feature point matching in the sliding window between the target frame and the perspective image sequences corresponding to the respective matching frames comprises:
taking the result of performing inter-frame feature point matching in the sliding window between the target frame and the perspective image sequences corresponding to the respective matching frames as the partial feature track.

4. The method of claim 2, wherein the obtaining a partial feature track based on a result of inter-frame feature point matching in the sliding window between the target frame and the perspective image sequences corresponding to the respective matching frames comprises:
using the result of performing inter-frame feature point matching in the sliding window between the target frame and the perspective image sequences corresponding to the respective matching frames as a first matching result;
performing inter-frame feature point matching between each perspective image in the perspective image sequence corresponding to the target frame and a perspective image sequence corresponding to a matching frame closest to the target frame to obtain a second matching result; and
obtaining the partial feature track based on the first matching result and the second matching result.

5. The method of claim 1, wherein the method further comprises performing following operations on the visual map:
performing a triangulation on feature points in the visual map to determine three-dimensional coordinates of the feature points;
performing a global beam adjustment optimization based on a visual constraint and a relative pose constraint on the feature points and the pose information to obtain updated feature points and pose information;
performing a triangulation based on Random Sample Consensus (RANSAC) on the updated feature points, and deleting a mismatching point in the feature points to obtain second time updated feature points;
performing the global beam adjustment optimization based on the visual constraint and the relative pose constraint on the updated pose information and the second time updated feature points to obtain second time updated pose information and third time updated feature points; and
determining an updated visual map based on the second time updated pose information and the third time updated feature points.

6. An electronic device, comprising:
one or more processors; and
a memory storing one or more programs thereon,
wherein the one or more programs when executed by the one or more processors, cause the one or more processors to perform operations, the operations comprising:
performing semantic segmentation on each of panoramic image frames from a panoramic image sequence of a target area, and deleting a preset segmentation target from each of the panoramic image frames to obtain preprocessed panoramic image frames;
determining pose information of each panoramic image frame from the preprocessed panoramic image frames, and determining a perspective image sequence from each panoramic image frame;
determining a feature track corresponding to the panoramic image sequence based on perspective image sequences corresponding to adjacent panoramic image frames; and constructing a visual map of the target area based on the feature track and the pose information of each panoramic image frame.

7. The electronic device of claim 6, wherein the feature track is obtained by performing following feature point matching on the panoramic image sequence:
   determining a first panoramic image frame in the panoramic image sequence as a target frame, and determining a preset number of panoramic image frames following the target frame in the panoramic image sequence as a matching frame sequence, the preset number being greater than 1;
   reading a perspective image sequence corresponding to the target frame and perspective image sequences corresponding to respective matching frames in the matching frame sequence into a preset sliding window respectively, and obtaining a partial feature track based on a result of performing inter-frame feature point matching in the sliding window between the target frame and the perspective image sequences corresponding to the respective matching frames;
   clearing the sliding window in response to completion of inter-frame feature point matching between the target frame and the respective matching frames, and deleting the target frame from the panoramic image sequence to obtain an updated panoramic image sequence; and
   performing the feature point matching on the updated panoramic image sequence until a last panoramic image frame in the panoramic image sequence has been used as a matching frame to complete the inter-frame feature point matching with the target frame to obtain the feature track.

8. The electronic device of claim 7, wherein the obtaining a partial feature track based on a result of inter-frame feature point matching in the sliding window between the target frame and the perspective image sequences corresponding to the respective matching frames comprises:
   taking the result of performing inter-frame feature point matching in the sliding window between the target frame and the perspective image sequences corresponding to the respective matching frames as the partial feature track.

9. The electronic device of claim 7, wherein the obtaining a partial feature track based on a result of inter-frame feature point matching in the sliding window between the target frame and the perspective image sequences corresponding to the respective matching frames comprises:
   using the result of performing inter-frame feature point matching in the sliding window between the target frame and the perspective image sequences corresponding to the respective matching frames as a first matching result;
   performing inter-frame feature point matching between each perspective image in the perspective image sequence corresponding to the target frame and a perspective image sequence corresponding to a matching frame closest to the target frame to obtain a second matching result; and
   obtaining the partial feature track based on the first matching result and the second matching result.

10. The electronic device of claim 6, wherein the operations further comprise performing following operations on the visual map:
    performing a triangulation on feature points in the visual map to determine three-dimensional coordinates of the feature points;
    performing a global beam adjustment optimization based on a visual constraint and a relative pose constraint on the feature points and the pose information to obtain updated feature points and pose information;
    performing a triangulation based on Random Sample Consensus (RANSAC) on the updated feature points, and deleting a mismatching point in the feature points to obtain second time updated feature points;
    performing the global beam adjustment optimization based on the visual constraint and the relative pose constraint on the updated pose information and the second time updated feature points to obtain second time updated pose information and third time updated feature points; and
    determining an updated visual map based on the second time updated pose information and the third time updated feature points.

11. A non-transitory computer readable medium storing a computer program thereon, wherein the program, when executed by a processor, cause the processor to perform operations, the operations comprising:
    performing semantic segmentation on each of panoramic image frames from a panoramic image sequence of a target area, and deleting a preset segmentation target from each of the panoramic image frames to obtain preprocessed panoramic image frames;
    determining pose information of each panoramic image frame from the preprocessed panoramic image frames, and determining a perspective image sequence from each panoramic image frame;
    determining a feature track corresponding to the panoramic image sequence based on perspective image sequences corresponding to adjacent panoramic image frames; and
    constructing a visual map of the target area based on the feature track and the pose information of each panoramic image frame.

12. The non-transitory computer readable medium of claim 11, wherein the feature track is obtained by performing following feature point matching on the panoramic image sequence:
    determining a first panoramic image frame in the panoramic image sequence as a target frame, and determining a preset number of panoramic image frames following the target frame in the panoramic image sequence as a matching frame sequence, the preset number being greater than 1;
    reading a perspective image sequence corresponding to the target frame and perspective image sequences corresponding to respective matching frames in the matching frame sequence into a preset sliding window respectively, and obtaining a partial feature track based on a result of performing inter-frame feature point matching in the sliding window between the target frame and the perspective image sequences corresponding to the respective matching frames;
    clearing the sliding window in response to completion of inter-frame feature point matching between the target frame and the respective matching frames, and deleting the target frame from the panoramic image sequence to obtain an updated panoramic image sequence; and
    performing the feature point matching on the updated panoramic image sequence until a last panoramic image frame in the panoramic image sequence has been used as a matching frame to complete the inter-frame feature point matching with the target frame to obtain the feature track.

13. The non-transitory computer readable medium of claim 12, wherein the obtaining a partial feature track based on a result of inter-frame feature point matching in the sliding window between the target frame and the perspective image sequences corresponding to the respective matching frames comprises:

taking the result of performing inter-frame feature point matching in the sliding window between the target frame and the perspective image sequences corresponding to the respective matching frames as the partial feature track.

14. The non-transitory computer readable medium of claim 11, wherein the obtaining a partial feature track based on a result of inter-frame feature point matching in the sliding window between the target frame and the perspective image sequences corresponding to the respective matching frames comprises:

using the result of performing inter-frame feature point matching in the sliding window between the target frame and the perspective image sequences corresponding to the respective matching frames as a first matching result;

performing inter-frame feature point matching between each perspective image in the perspective image sequence corresponding to the target frame and a perspective image sequence corresponding to a matching frame closest to the target frame to obtain a second matching result; and obtaining the partial feature track based on the first matching result and the second matching result.

15. The non-transitory computer readable medium of claim 11, wherein the operations further comprise performing following operations on the visual map:

performing a triangulation on feature points in the visual map to determine three-dimensional coordinates of the feature points;

performing a global beam adjustment optimization based on a visual constraint and a relative pose constraint on the feature points and the pose information to obtain updated feature points and pose information;

performing a triangulation based on Random Sample Consensus (RANSAC) on the updated feature points, and deleting a mismatching point in the feature points to obtain second time updated feature points;

performing the global beam adjustment optimization based on the visual constraint and the relative pose constraint on the updated pose information and the second time updated feature points to obtain second time updated pose information and third time updated feature points; and determining an updated visual map based on the second time updated pose information and the third time updated feature points.

\* \* \* \* \*